(12) United States Patent
Gokhale et al.

(10) Patent No.: US 11,194,727 B2
(45) Date of Patent: *Dec. 7, 2021

(54) INCREASED PARALLELIZATION EFFICIENCY IN TIERING ENVIRONMENTS

(71) Applicant: International Business Machines Corporation, Armonk, NY (US)

(72) Inventors: Amey Gokhale, Pune (IN); Ranjith R. Nair, Bangalore (IN); Sandeep R. Patil, Pune (IN); Sasikanth Eda, Vijayawada (IN)

(73) Assignee: International Business Machines Corporation, Armonk, NY (US)

(*) Notice: Subject to any disclaimer, the term of this patent is extended or adjusted under 35 U.S.C. 154(b) by 52 days.

This patent is subject to a terminal disclaimer.

(21) Appl. No.: 16/732,638

(22) Filed: Jan. 2, 2020

(65) Prior Publication Data

US 2020/0133872 A1 Apr. 30, 2020

Related U.S. Application Data

(63) Continuation of application No. 16/129,410, filed on Sep. 12, 2018, now Pat. No. 10,572,386.

(51) Int. Cl.
*G06F 12/02* (2006.01)
*G06F 12/0884* (2016.01)
(Continued)

(52) U.S. Cl.
CPC ...... *G06F 12/0884* (2013.01); *G06F 11/1461* (2013.01); *G06F 12/02* (2013.01); *G06F 12/06* (2013.01); *G06F 12/0897* (2013.01)

(58) Field of Classification Search
CPC ...... G06F 12/0897; G06F 12/06; G06F 12/02; G06F 12/0884; G06F 11/1461
(Continued)

(56) References Cited

U.S. PATENT DOCUMENTS

| 5,950,199 | A | 9/1999 | Schmuck et al. |
| 10,572,386 | B1 * | 2/2020 | Gokhale ............... G06F 12/02 |

(Continued)

OTHER PUBLICATIONS

IBM, "Introduction to Cloud services," IBM Knowledge Center, retrieved on Sep. 8, 2018, from https://www.ibm.com/support/knowledgecenter/en/STXKQY_5.0.0/com.ibm.spectrum.scale.v5r00.doc/bl1ins_mcstore_intro.htm, pp. 1-6.
(Continued)

*Primary Examiner* — Than Nguyen
(74) *Attorney, Agent, or Firm* — Zilka-Kotab, P.C.

(57) ABSTRACT

A computer-implemented method, according to one embodiment, includes: identifying block addresses which are associated with a given object, and combining the block addresses to a first set in response to determining that at least one token is currently issued on one or more of the identified block addresses. A first portion of the block addresses is transitioned to a second set, where the first portion includes ones of the block addresses determined as having a token currently issued thereon. Moreover, a second portion of the block addresses is divided into equal chunks, where the second portion includes the block addresses remaining in the first set. The chunks in the first set are allocated across two or more parallelization units. Furthermore, the block addresses in the second set are divided into equal chunks, and the chunks in the second set are allocated to at least one dedicated parallelization unit.

20 Claims, 9 Drawing Sheets

(51) Int. Cl.
  *G06F 11/14* (2006.01)
  *G06F 12/0897* (2016.01)
  *G06F 12/06* (2006.01)
(58) Field of Classification Search
  USPC ......................................................... 711/202
  See application file for complete search history.

(56) References Cited

U.S. PATENT DOCUMENTS

| | | |
|---|---|---|
| 2009/0019098 A1 | 1/2009 | Gunda et al. |
| 2012/0110586 A1 | 5/2012 | Coon et al. |
| 2012/0278442 A1* | 11/2012 | Saika .................. G06F 3/061 709/219 |
| 2014/0304451 A1* | 10/2014 | Shibayama ........... G06F 3/0644 711/103 |
| 2015/0067691 A1 | 3/2015 | Johnson et al. |
| 2015/0153957 A1* | 6/2015 | Shibayama ......... G06F 12/0246 711/103 |
| 2015/0242241 A1 | 8/2015 | Bronsart et al. |
| 2016/0054953 A1 | 2/2016 | Lee et al. |
| 2016/0202985 A1 | 7/2016 | Lin |
| 2019/0065205 A1 | 2/2019 | Lin |
| 2020/0081843 A1 | 3/2020 | Gokhale et al. |

OTHER PUBLICATIONS

IBM, "Token Management," IBM Community, Sep. 2014, 3 pages, retrieved from https://www.ibm.com/developerworks/community/wikis/home?lang=eng#!/wiki/General%20Parallel%20File%20System%20%28GPFS%29/page/Token%20Management on Sep. 8, 2018.
Aws, "Get Object," Amazon Simple Storage Service, retrieved on Sep. 8, 2018, from https://docs.aws.amazon.com/AmazonS3/latest/API/RESTObjectGET.html, pp. 1-16.
Fielding et al., "Header Field Definitions," Hypertext Transfer Protocol, Section 14.35, retrieved on Sep. 8, 2018, from https://www.w3.Org/Protocols/rfc2616/rfc2616-sec14.html#sec14.35, pp. 1-35.
CSRC, "Cloud Computing," Computer Security Resource Center, Oct. 2017, 3 pages, retrieved from https://csrc.nist.gov/projects/cloud-computing on Sep. 8, 2018.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
Gokhale et al., U.S. Appl. No. 16/129,410, filed Sep. 12, 2018.
Notice of Allowance from U.S. Appl. No. 16/129,410, dated Oct. 18, 2019.

* cited by examiner

INCREASED PARALLELIZATION EFFICIENCY IN TIERING ENVIRONMENTS

BACKGROUND

The present invention relates to data storage systems, and more specifically, this invention relates to selectively distributing data in cloud tiering environments.

The cost per unit (e.g., Gigabyte) of storage is typically higher for higher performance (e.g., faster) storage than it is for relatively lower performance storage. Thus, tiers of storage having different performance characteristics may be grouped together to form a multi-tiered data storage system.

The capacity of a higher performance data storage tier is typically smaller than the capacity of a lower data storage tier in view of their relative prices. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Storage blocks that are considered "hot" or "hotter" tend to have a frequent updated rate, while storage blocks that are considered "cold" or "colder" have an update rate which is at least slower than that of hot blocks. Additional factors may be incorporated into the determination of the relative heat of a given portion of data, e.g., such as read frequency. It follows that this promotion and demotion process of data actually relocates the data from one tier to another, and may even be performed without the knowledge of an application that is running.

The different tiers of a multi-tiered data storage system may also be physically separated from each other. For instance, cloud tiering is a feature which provides a cloud storage environment as an extended and remote storage tier option to on-premise filesystems. Conventional implementations of cloud tiering and similar kinds of cloud-as-tier features exploit parallelization to a certain degree, such as parallelizing backup jobs, parallelizing restore jobs, parallelizing encryption jobs, or parallelizing md5 reconciliation jobs.

However, practical results achieved by these conventional implementations have proven cloud tiering to be ineffective, as it causes increased delay in both backup and restore operations. Accordingly, cloud tiering and similar storage system architectures are unreliable.

SUMMARY

A computer-implemented method, according to one embodiment, includes: identifying block addresses which are associated with a given object, and combining the block addresses to a first set in response to determining that at least one token is currently issued on one or more of the identified block addresses. A first portion of the block addresses is transitioned to a second set, where the first portion includes ones of the block addresses determined as having a token currently issued thereon. Moreover, a second portion of the block addresses is divided into equal chunks, where the second portion includes the block addresses remaining in the first set. The chunks in the first set are allocated across two or more parallelization units. Furthermore, the block addresses in the second set are divided into equal chunks, and the chunks in the second set are allocated to at least one dedicated parallelization unit.

A computer program product, according to another embodiment, includes a computer readable storage medium having program instructions embodied therewith. The program instructions are readable and/or executable by a processor to cause the processor to perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
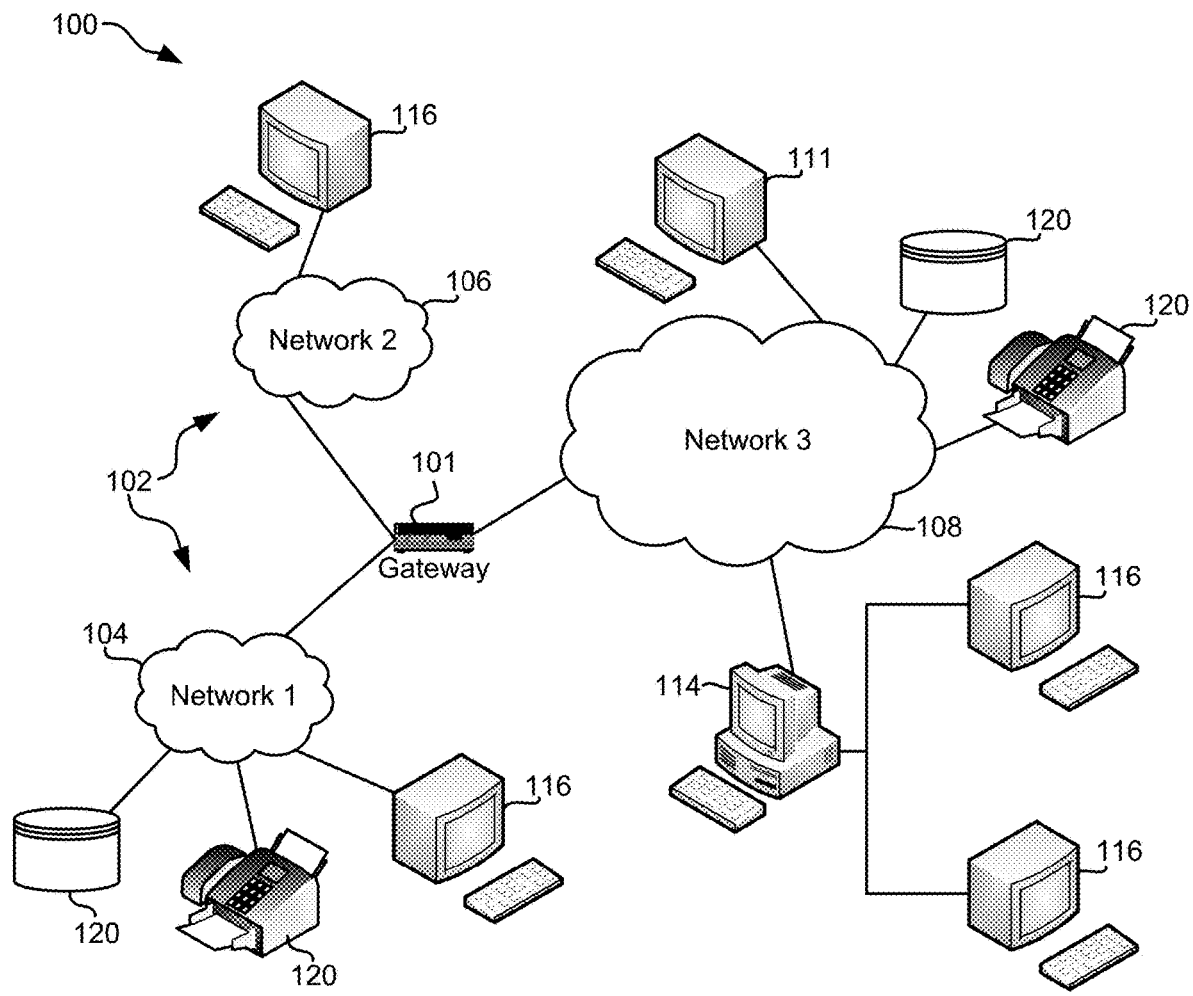
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying block address ranges having tokens issued thereon for each object and/or file which corresponds to a received operation request. Likewise, some of the embodiments here are able to re-arrange (e.g., distribute) the block address ranges across for parallelization units such that a maximum number of parallelization units are in a working state, thereby increasing efficiency of the system as a whole, e.g., as will be described in further detail below.

In one general embodiment, a computer-implemented method includes: receiving an operation request which corresponds to a given object, identifying multiple block addresses which are associated with the given object, determining whether any one or more of the identified block addresses have a token currently issued thereon, and combining the multiple block addresses to a first set in response to determining that at least one token is currently issued on one or more of the identified block addresses. A first portion of the block addresses is transitioned to a second set, where the first portion includes ones of the block addresses determined as having a token currently issued thereon. A second portion of the block addresses is also divided into equal chunks, where the second portion includes the block addresses remaining in the first set. The chunks are allocated in the first set across two or more parallelization units, and the block addresses in the second set are divided into equal chunk. Furthermore, the chunks in the second set are allocated to at least one dedicated parallelization unit.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, an operation request which corresponds to a given object; identifying, by the processor, multiple block addresses which are associated with the given object; determining, by the processor, whether any one or more of the identified block addresses have a token currently issued thereon; and combining, by the processor, the multiple block addresses to a first set in response to determining that at least one token is currently issued on one or more of the identified block addresses. A first portion of the block addresses is transitioned, by the processor, to a second set, where the first portion includes ones of the block addresses determined as having a token currently issued thereon. Moreover, a second portion of the block addresses is divided, by the processor, into equal chunks, where the second portion includes the block addresses remaining in the first set. The chunks in the first set are also allocated, by the processor, across two or more parallelization units; and the block addresses in the second set are divided into equal chunks by the processor. Furthermore, the chunks in the second set are allocated, by the processor, to at least one dedicated parallelization unit.

In yet another general embodiment, a system includes: a processor; and logic integrated with the processor, executable by the processor, or integrated with and executable by the processor. The logic is configured to: receive, by the processor, an operation request which corresponds to a given file in a filesystem; identify, by the processor, multiple block addresses which are associated with the given file; determine, by the processor, whether any one or more of the identified block addresses have a token currently issued thereon; and combine, by the processor, the multiple block addresses to a first set in response to determining that at least one token is currently issued on one or more of the identified block addresses. A first portion of the block addresses is transitioned, by the processor, to a second set, where the first portion includes ones of the block addresses determined as having a token currently issued thereon. A second portion of the block addresses is also divided, by the processor, into equal chunks, where the second portion includes the block addresses remaining in the first set. The chunks in the first set are allocated, by the processor, across two or more parallelization units; and the block addresses in the second set are divided into equal chunks by the processor. Furthermore, the chunks in the second set are allocated, by the processor, to at least one dedicated parallelization unit.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
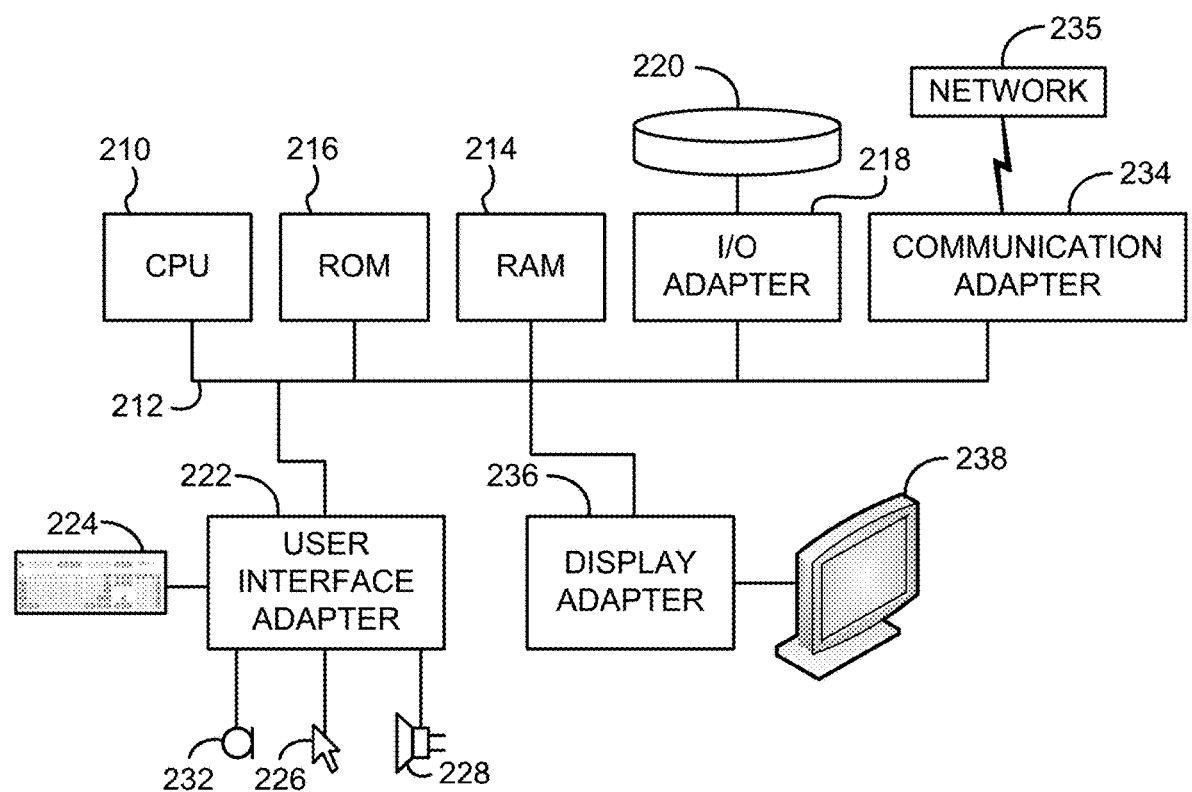
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
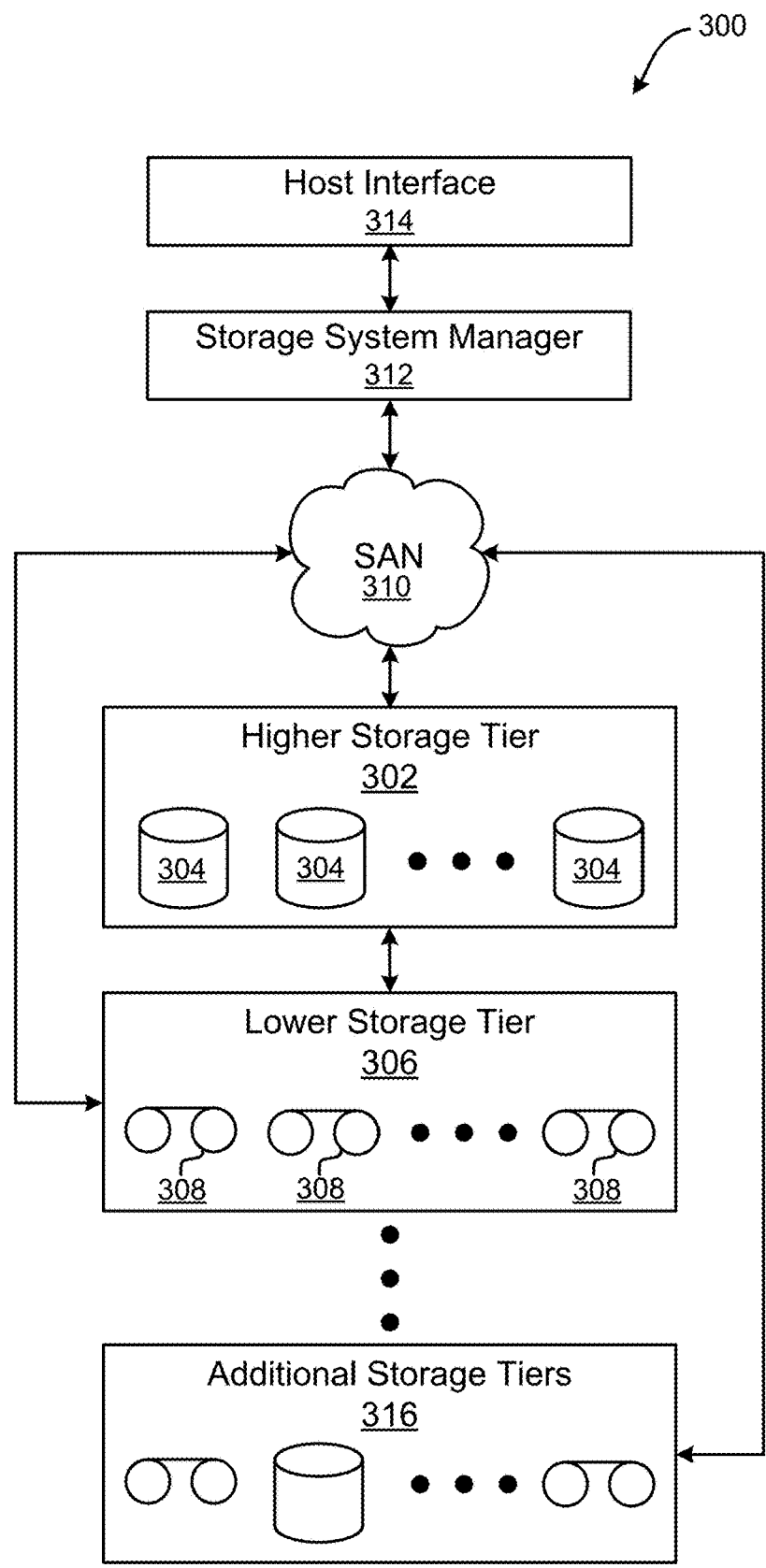
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash storage, SSD arrays, flash storage arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of data storage media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different data storage media within each storage tier. For example, each data storage tier may include the same type of data storage media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
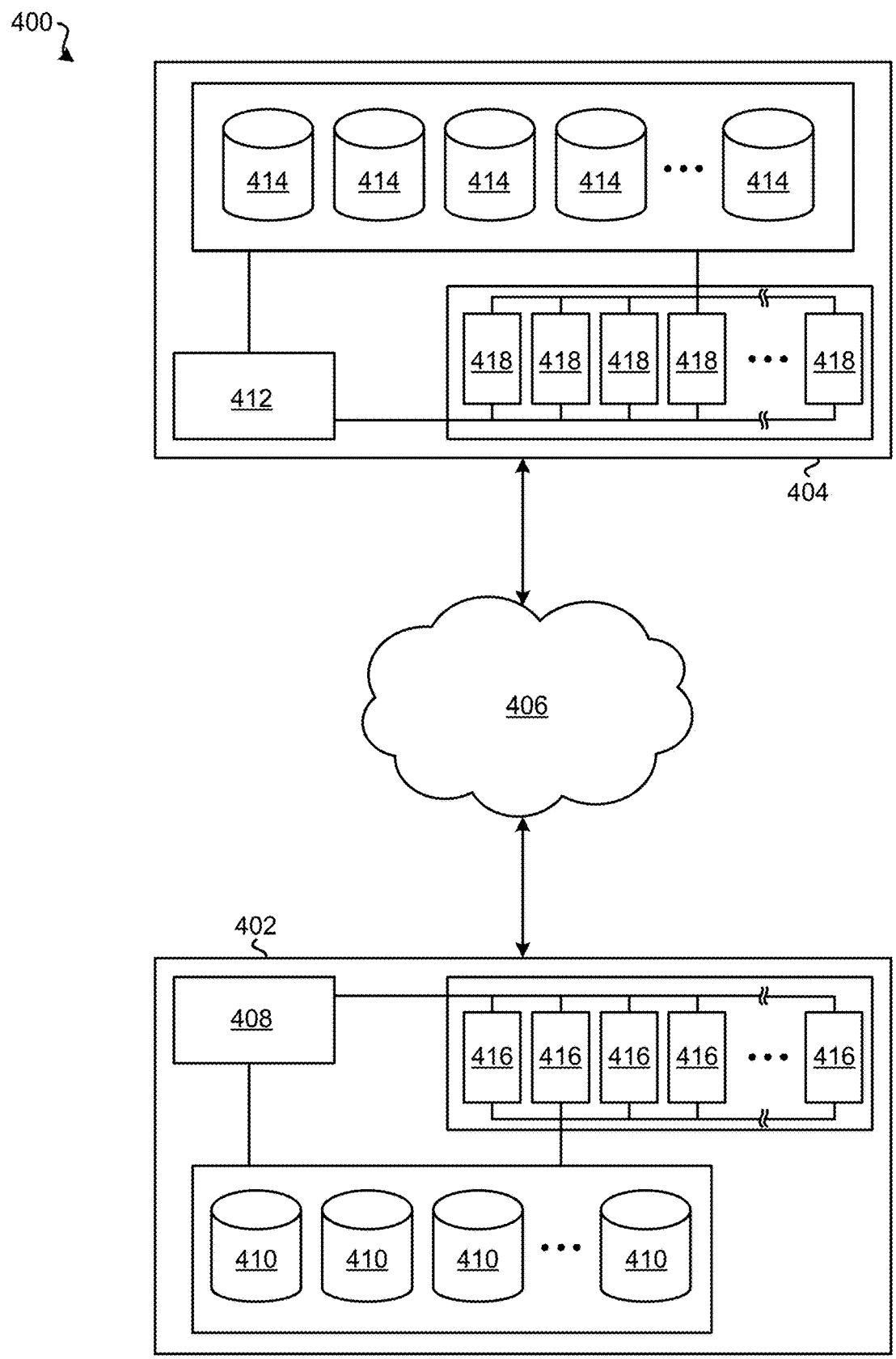
FIG. 4 is a partial representative view of a storage environment in accordance with one embodiment.

Looking now to FIG. 4, a representational view of a cloud-as-tier storage environment 400 is illustrated in accordance with one embodiment. As an option, the present storage environment 400 may be implemented in conjunction with features from any other embodiment listed herein, such as those described with reference to the other FIGS. However, such storage environment 400 and others presented herein may be used in various applications and/or in permutations which may or may not be specifically described in the illustrative embodiments listed herein. Further, the storage environment 400 presented herein may be used in any desired environment. Thus FIG. 4 (and the other FIGS.) may be deemed to include any possible permutation.

As shown, the storage environment 400 includes an on-premise storage location 402 and a remote cloud storage environment 404 which are connected by a network 406. In some approaches the network 406 is a SAN, e.g., as described above, but may include any desired type of network depending on the approach.

Looking to the on-premise storage location 402, a central controller 408 is coupled to an array of data storage devices 410. According to some approaches, the array of data storage devices 410 serves as tier in a filesystem. Moreover, it should be noted that although only one array of data storage devices 410 is shown in the present embodiment, any number of additional arrays may be implemented in the on-premise storage location 402, e.g., to introduce additional storage tiers having different levels of performance.

The remote cloud storage environment 404 also includes a central controller 412 which is in turn coupled to an array of data storage devices 414. Again, although only one array of data storage devices 414 is shown in the present embodiment, any number of additional arrays may be implemented in the remote cloud storage environment 404, e.g., to introduce additional tiers of performance.

In some approaches, each of the storage devices 410, 414 in each of the respective arrays are of a same type of storage, e.g., SSD, HDD, magnetic tape, etc. According to an illustrative example, each of the storage devices 410 in the array at the on-premise storage location 402 include SSDs, while each of the storage devices 414 in the array at the remote cloud storage environment 404 include HDDs. However, in other approaches the various storage devices in either of the respective arrays may include more than one different type of storage.

The storage capacity of the on-premise storage location 402 also differs from the storage capacity of the remote cloud storage environment 404 in some approaches. The network 406 allows for the remote cloud storage environment 404 to be established at a removed location which has fewer spatial constraints than the on-premise storage location 402. Accordingly, the remote cloud storage environment 404 may include more storage devices 414 than the on-premise storage location 402, thereby affording the remote cloud storage environment 404 a greater relative storage capacity. Although not shown in the present embodiment, this increased storage capacity allows for the remote cloud storage environment 404 to be connected to more than one on-premise storage location.

The on-premise storage location 402 further includes multiple parallelization units 416 which are capable of communicating with the controller 408 as well as the storage devices 410. Similarly, the remote cloud storage environment 404 includes parallelization units 418 which are able to communicate with the respective controller 412 and the storage devices 414. Each of the parallelization units 416, 418 are preferably able to perform operations and/or portions thereof in parallel. In some approaches, one or more of the parallelization units 416, 418 include threads. A "thread" is similar to a process in that it can be time-sliced by a kernel. For instance, multiprocessor systems are able to run different threads simultaneously and in parallel. In other approaches, one or more of the parallelization units 416, 418 include processes which are able to be performed by the respective parallelization units 416, 418 simultaneously and in parallel. It follows that each of the parallelization units 416, 418 include a controller, processor, computer, etc. therein depending on the approach.

It follows that the storage environment 400 provides a cloud tiering feature in some approaches. As mentioned above, cloud tiering is a feature which provides a cloud storage environment as an extended and remote storage tier option to on-premise filesystems. The cloud technology used by this feature implements object-based and/or blob-based storage which may be implemented publicly, privately, or in an on-premises configuration. Specifically, an Information Life Cycle Management (ILM) migration policy is used to determine candidates for migration to a cloud pool. File details which are migrated to a cloud pool are stored in a database. The file details typically include the filename, size, md5, path, cloud UUID, etc., and other metadata details for each migrated file. Accordingly, in some approaches each of the objects stored in the remote cloud storage environment 404 include data which actually represents the corresponding file itself, as well as metadata which provides additional information of the file.

Furthermore, each migrated file leaves a "stub" on the filesystem and is stored as two separate objects, one of which corresponds to the data, while the other corresponds to the metadata. A container is also created for each of the migrated files. According to an example, which is in no way intended to limit the invention "file1.txt" on a filesystem would be stored as {container name: 2020201010; object-1:2020201010.data; object-2:2020201010.meta} at a cloud storage location.

Furthermore, whenever a read and/or write event is performed on a given stub, the Light Weight Events (LWE) policy is used to capture these events and trigger a recall script. The recall script is used in some approaches to reconstruct the given file based on data and metadata objects stored at the cloud storage location.

High-performance clustered filesystems (e.g., such as General Parallel File System) use what is referred to as a "token" to keep track of what nodes are permitted to create, modify, and/or read a given file. These tokens are then used in some approaches to lock (e.g., using Portable Operating System Interface (POSIX) locking) certain files. The tokens are also used to determine which server(s) are in control of the given file lock, and which server(s) do not. In high-performance clustered filesystems such as General Parallel File System (GPFS), one or more nodes provide tokens to the remainder of the cluster, and are referred to as "token managers". These token managers are selected automatically in some approaches from the nodes already designated as managers. Furthermore, the token managers are responsible for keeping track of all the tokens in the cluster, yet they do not maintain file metadata which is performed by one or more meta nodes.

Current implementations of cloud-as-tier features have proven to generally be ineffective as they cause increased delay in performing both backup and restore operations. This increased delay is generally caused by threads waiting to obtain a token to access a particular block range. Consider a scenario in which parallel threads are invoked to perform a backup of a file, which resides on filesystem, to a cloud storage environment. Accordingly, each of the parallel threads is responsible for packing a certain set of blocks, encrypting, writing manifestation and pushing packed blocks to the cloud environment. Meanwhile, assume that an application residing on the filesystem has requested access to certain ones of the same block ranges and/or portions thereof. In response, the filesystem token manager may have already granted tokens for the requesting application. In this kind of scenario, a set of one or more invoked threads end up waiting for a token to access certain blocks, thereby delaying the overall backup operation.

In a similar situation, parallel threads may be invoked to perform a restore of an object, which resides at a cloud location, to a filesystem. Accordingly, each thread is responsible for unpacking a certain set of object blocks, decrypting, building metadata from manifestation, and pulling unpacked blocks to the filesystem namespace. Meanwhile, assume that an application residing at the cloud location has requested access to certain ones of the same block ranges and/or portions thereof. Accordingly, the cloud token manager may have already granted one or more tokens to the requesting application. In this kind of scenario, a set of one or more invoked threads end up waiting for a token to access certain blocks, thereby delaying the overall backup operation.

Figure 5:
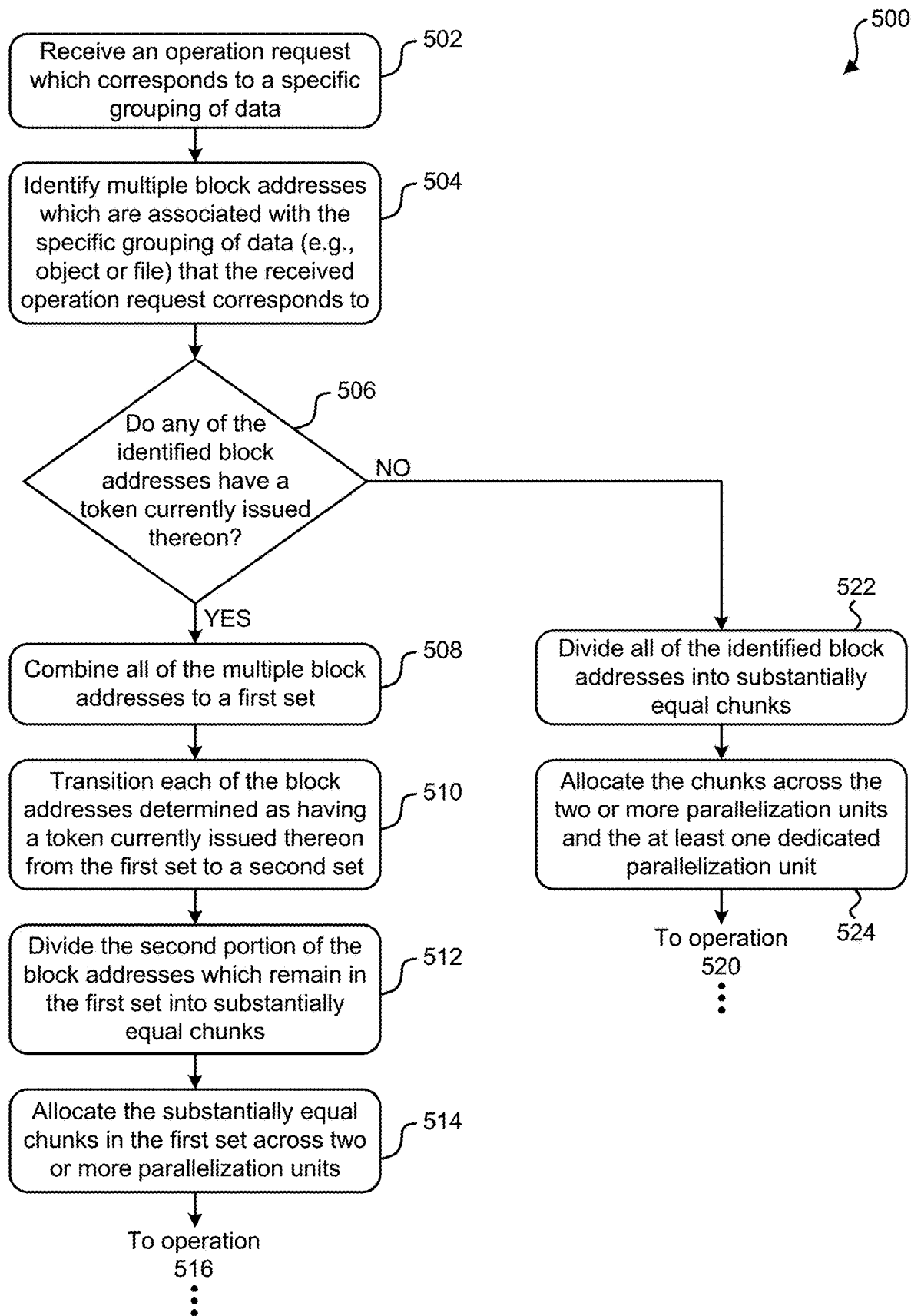
FIG. 5 is a flowchart of a method in accordance with one embodiment.
Figure 5:
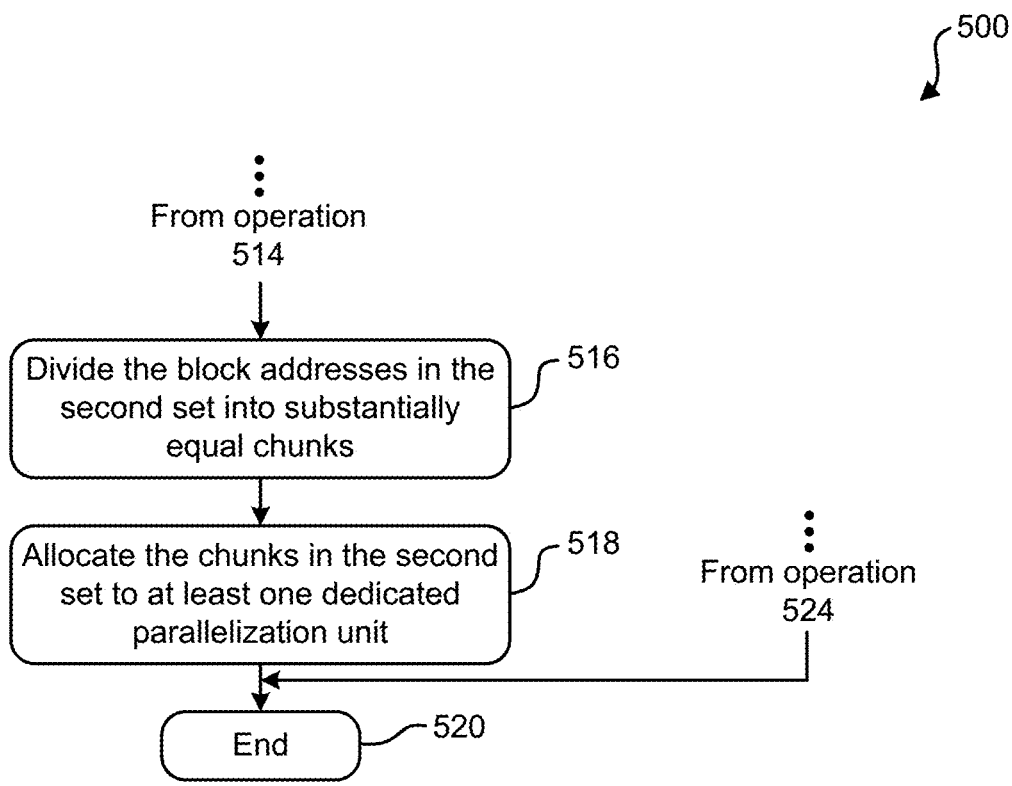

However, looking now to FIG. 5, an improved method 500 for efficiently transferring data and scheduling parallelization units in a cloud tiering environment, is illustrated in accordance with one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, a computer, etc., or some other device having one or more processors therein. Thus, in some embodiments, method 500 may be a computer-implemented method. Moreover, the processing component used to perform the various processes included in method 500 may be located at different positions in the cloud tiering environment. For instance, in some approaches the processing component is located at the cloud storage location (e.g., see controller 412 in FIG. 4). In other approaches the processing component is located at an on-premise storage location (e.g., see controller 408 in FIG. 4). It should also be noted that the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving an operation request which corresponds to a specific grouping of data. The specific grouping of data may be a particular file or object depending on the data storage architecture of the given approach. Again, various ones of the processes included in method 500 are performed by a processing component which is incorporated at the cloud storage location in some approaches, while various ones of the processes are performed by a processing component which is incorporated at an on-premise storage location in other approaches. Accordingly, the type of data storage architecture implemented at the cloud storage location and/or the on-premise storage location determines whether the operation request received corresponds to a file or an object in some approaches.

The type of operation request received also varies depending on the approach. For instance, in some approaches the operation request is a data access request received at the cloud storage location from a remote storage location, thereby prompting the retrieval of one or more objects from storage which include the data requested. However, in other approaches the operation request may be a write request received at the cloud storage location, a write request received at the on-premise storage location, a data backup request received from a cloud storage location, etc. According to some illustrative approaches which are in no way intended to limit the invention, the received operation request includes an object-based GET command corresponding to a specific read range. In such approaches, the GET command can include a range header in an object download request, whereby only a portion of a given object is preferably downloaded. In another illustrative approach, which again is in no way intended to limit the invention, the received operation request includes an object-based PUT command which corresponds to a given update range. The PUT command can also include a range header in an object update request, whereby only a portion of the object is preferably updated, e.g., as would be appreciated by one skilled in the art after reading the present description.

Furthermore, operation 504 includes identifying multiple block addresses which are associated with the specific grouping of data (e.g., object or file) that the received operation request corresponds to. The object or file which corresponds to the operation request is divided into a plurality of blocks, each of which is capable of storing an amount of data. Moreover, each of these blocks are identifiable by a block address.

A determination is also made as to whether any one or more of the identified block addresses have a token currently issued thereon. See decision 506. As described above, tokens are used to keep track of what nodes are permitted to create, modify, and/or read the data included in a given block of storage. These tokens are used in some approaches to lock the data included in the block of storage from being accessed while already in use. Tokens are also used to determine which one or more servers are in control of the given lock, and which one or more servers are not. According to specific examples, which are in no way intended to limit the invention, the token is a byte-range lock and/or a POSIX lock.

One or more specific nodes provide tokens to the remainder of the cluster in some approaches, and are referred to as "token managers". These token managers are selected automatically in some approaches from the nodes already designated as managers. Furthermore, the token managers are responsible for keeping track of all the tokens in the cluster, yet they may not maintain file metadata which is performed by one or more meta nodes in some approaches. It follows that any of the identified block addresses determined as having a token currently issued thereon are locked from being used. Accordingly, decision 506 is preferably performed by evaluating each of the block addresses identified in operation 504, e.g., in an iterative fashion until all of the block addresses have been evaluated.

Referring still to FIG. 5, method 500 proceeds to operation 508 in response to determining that at least one of the identified block addresses has a token currently issued thereon. In other words, method 500 proceeds to operation 508 in response to determining that at least one of the identified block addresses is currently locked from being used. There, operation 508 includes combining all of the multiple block addresses to a first set. In other words, all of the block addresses identified in operation 504 are added to the first set in response to determining that any one or more of these block addresses are currently locked from use in decision 506. The first set may be a dedicated portion of storage, a logical queue, a lookup table, etc., depending on the desired embodiment.

Furthermore, operation 510 includes transitioning each of the block addresses determined as having a token currently issued thereon from the first set to a second set. In other words, operation 510 includes removing a first portion of the block addresses determined as having a token currently issued thereon from the first set, and transitioning this first portion of the block addresses to a second set which is different than the first set. Accordingly, the second set may be a dedicated portion of storage, a logical queue, a lookup table, etc., which is different than the first set.

It follows that the block addresses which remain in the first set include each of the block addresses determined as not having a token currently issued thereon. These block addresses which remain in the first set may be considered as being a "second portion" of the identified block addresses which are currently unlocked and thereby free from any general use restrictions. Thus, moving to operation 512, this second portion of the block addresses which remain in the first set are divided into substantially equal chunks. While each block of storage itself has an about equal size (i.e., is able to store an about equal amount of data), the number of blocks and/or their general groupings with respect to each other may prevent the multiple block addresses identified in operation 504 from being seamlessly divisible. Moreover, the number of chunks which the second portion of the block addresses are actually divided into also has an effect on the process. For example, an odd number of block addresses (blocks) cannot be equally divided into an even number of chunks. However, the second portion of the block addresses are again preferably divided into chunks which are substantially equal in size, e.g., based on the number of blocks assigned thereto, the total amount of data included in the blocks assigned thereto, etc.

Moving to operation 514, the substantially equal chunks in the first set are allocated across two or more parallelization units. It is again preferred that the chunks are evenly distributed across available parallelization units, e.g., such that the workloads placed on each of the available parallelization units are about equal. However, the number of chunks may be different than the number of available parallelization units. Accordingly, in some approaches the chunks may be unevenly assigned to the parallelization units, e.g., in order to avoid creating a backlog of chunks. In other approaches the chunks may be evenly distributed across the available parallelization units, while any remaining chunks are accumulated in a pool, buffer, queue, etc. These remaining chunks may thereafter be assigned to the parallelization units as they complete processing the chunks which were assigned thereto and become available. For example, remaining chunks may be assigned to the parallelization units from the pool, buffer, queue, etc., in a first-in-first-out (FIFO) manner, a last-in-first-out (LIFO) manner, according to an order specified by a user, etc.

As mentioned above, in some approaches the parallelization units include processes and/or threads, each of which are able to perform operations and/or portions thereof simultaneously and in parallel. Thus, each of the two or more parallelization units are able to perform a portion of the operation request which corresponds to the chunks allocated thereto, in parallel. According to an example, which is in no way intended to limit the invention, the operation request originally received in operation 502 is a data access request received from a remote storage location. In this example, the data corresponding to the access request is split into a plurality of substantially equal chunks, and each of these chunks are assigned to a respective parallelization unit (e.g., thread). Each of the parallelization units are thereby able to send the data included in the respective chunk assigned thereto, in parallel, to the remote storage location. As a result, the parallelization units are able to perform the corresponding portions of the data access request with a reduced amount of processing delay.

With continued reference to FIG. 5, operation 516 includes dividing the block addresses in the second set into substantially equal chunks. As mentioned above, the block addresses determined as having a token currently issued thereon are transitioned from the first set to the second set. Thus, the second set includes the blocks which have a token currently issued thereon. Again, while each block of storage itself is about equal in size, the number of blocks and/or their general groupings with respect to each other may prevent the block addresses in the second set from being seamlessly divisible. Moreover, the number of chunks which the block addresses in the second set are actually divided into also has an effect on the process. However, the block addresses in the second set are again preferably divided into chunks which are substantially equal in size, e.g., based on the number of blocks included therein, the total amount of data included in the blocks, etc.

Method 500 further includes allocating the chunks in the second set to at least one dedicated parallelization unit. See operation 518. Restricting the chunks determined as including one or more block addresses which have a token currently issued thereon to dedicated parallelization units is desirable as it limits the impact that the tokens have on the performance of the overall operation request. In other words, by limiting the number of parallelization units which currently locked blocks are allocated to, the amount of the received operation request which can be performed without experiencing delay is increased. As a result, the overall efficiency of method 500 is increased, particularly in view of the shortcomings experienced by conventional processes, e.g., as described above.

From operation 518, the flowchart of FIG. 5 proceeds to operation 520, whereby method 500 may end. However, it should be noted that although method 500 may end upon reaching operation 520, any one or more of the processes included in method 500 may be repeated in order to process additional operation requests.

Returning to decision 506, method 500 proceeds to operation 522 in response to evaluating each of the identified block addresses and determining that none of them have a token currently issued thereon. In other words, method 500 proceeds to operation 522 in response to determining that none of the block addresses identified in operation 504 are currently locked. There, operation 522 includes dividing all of the identified block addresses into substantially equal chunks, e.g., according to any of the approaches described above. Moreover, operation 524 includes allocating the chunks across the two or more parallelization units and the at least one dedicated parallelization unit. In other words, the chunks are evenly distributed across all of the available parallelization units, including the dedicated parallelization units. It follows that in situations involving an operation request which corresponds to blocks, none of which have a token currently issued thereon, all available parallelization units are preferably used to perform the operation request. This process of allocating the chunks across all parallelization units (including the dedicated parallelization units) based on whether any one or more of the identified block addresses have a token currently issued thereon increases a number of parallelization units that are in a working state for any given situation. As a result, an amount of processing delay experienced by the operation request is significantly reduced, irrespective of whether tokens are a factor. Moreover, the amount of parallelization efficiency achieved is significantly increased, while also overcoming the conventional shortcomings described above.

From operation 524, the flowchart of FIG. 5 proceeds to operation 520, whereby method 500 may end. However, it should again be noted that although method 500 may end upon reaching operation 520, any one or more of the processes included in method 500 may be repeated in order to process additional operation requests. It should also be noted that in some approaches, method 500 may include operations in addition to those illustrated in FIG. 5. For instance, although not shown, method 500 includes determining whether each of the chunks have been assigned to a respective parallelization unit in some approaches. In other approaches, method 500 includes determining whether all of the chunks have been successfully implemented, e.g., in order to ensure that chunks which include blocks having tokens currently assigned thereon are eventually completed following the end of a waiting period, e.g., as would be appreciated by one skilled in the art after reading the present description.

It follows that various ones of the embodiments included herein are able to increase efficiency of parallelization units, as well as improve backup (e.g., restore) operations, particularly in tiered storage architectures which implement cloud storage. For instance, the ability to identify tokens which are currently issued on the block level, and implement this information while scheduling parallelization units significantly improves performance of the system as a whole.

Figure 6:
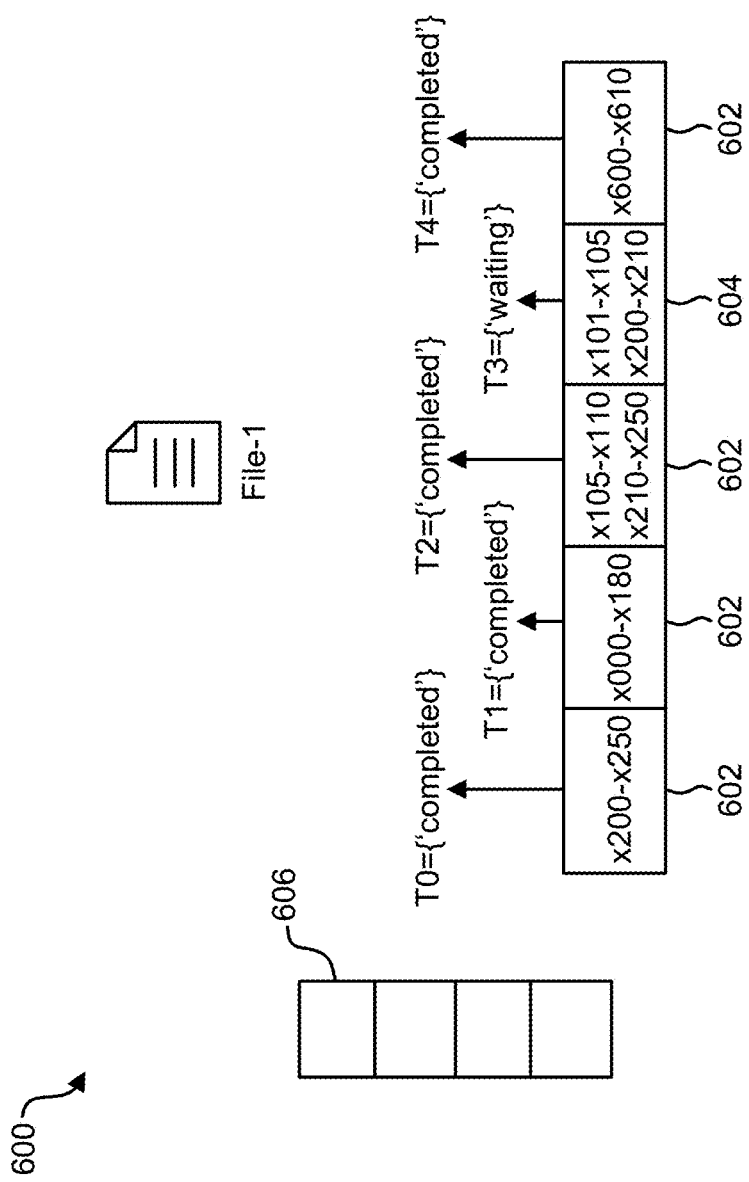
FIG. 6 is a partial representative view of an on-premise filesystem in accordance with one embodiment.

Looking now to FIG. 6, a representational view of an on-premise filesystem 600 is illustrated according to an in-use example, which is in no way intended to limit the invention. For instance, although the in-use example illustrated in FIG. 6 corresponds to an on-premise filesystem 600, various ones of the approaches described below can be implemented in other types of storage architectures, e.g., such as an object-based cloud storage location in a cloud tiering architecture, e.g., as would be appreciated by one skilled in the art after reading the present description.

As shown, the filesystem 600 includes four general purpose parallelization units 602 as well as a dedicated parallelization unit 604. Each of the parallelization units 602, 604 includes a thread which has a range of specific block addresses (also referred to herein as a "chunk") allocated thereto. These block addresses include data of a file File-1 which corresponds to a received operation request. Accordingly, the block addresses may have been identified using any of the approaches described above, e.g., with respect to method 500.

Referring still to FIG. 6, the filesystem 600 also includes a thread pool 606. The thread pool 606 acts as a buffer or queue which temporarily stores additional chunks of block addresses. Accordingly, a chunk of block addresses is allocated to a given one of the parallelization units 602, 604 in response to determining that the chunk previously allocated to the given one of the parallelization units 602, 604 has been completed. In other words, the thread pool 606 is used to ensure each portion of a received operation request is performed as parallelization units 602, 604 become available.

In operation, the framework implemented by the filesystem 600 is able to identify the size of a file which is to be backed up or restored as a result of an operation request received, and collect the corresponding block ranges. As described above, if no active tokens are detected for the identified block ranges, the block ranges are evenly distributed among all available parallelization units 602, 604. However, the number of parallelization units 602, 604 implemented depends on the size of the file in some approaches. Moreover, the parallelization units 602, 604 are able to complete the respective portions of the operation request and even determine the fulfillment of the operation request as a whole. For example, assume block addresses {x200-x250, x000-x180, x101-x110, x200-x250, x600-x610} are the block address ranges of a target file. In response to determining that none of the block addresses have a token currently assigned thereon, each cluster of block addresses is assigned to one of the five available parallelization units 602, 604.

However, returning to the in-use example illustrated in FIG. 6, if active tokens for at least some of the blocks addresses are identified, the details of the locked block addresses are preferably collected. For instance, according to the in-use example, two tokens are issued to an application for blocks {x101-x105, x200-210}, respectively. Accordingly, the remaining unlocked blocks are preferably grouped together and split into equal chunks. The chunks are then evenly distributed among the four general purpose parallelization units 602 as shown. However, the locked block addresses (having a token issued thereon) are grouped together separately and are allocated to different parallelization units which include the dedicated parallelization unit 604 in the present in-use example.

Accordingly, the dedicated parallelization unit 604 remains in a "waiting" state while the tokens remain issued on blocks {x101-x105, x200-210}, respectively. However, the four general purpose parallelization units 602 are free to complete the portions of the operation request which correspond to the block addresses allocated thereto, eventually entering a "completed" state as shown. As a result, the filesystem 600 is able to selectively group the block addresses which correspond to a given operation request, thereby increasing the efficiency of parallelization. Consideration is given to tokens issues on both (or multiple) edges (e.g., filesystem and cloud location) while also using the process of combining and splitting the block addresses into specific groups, each of which include unlocked block addresses or blocks having tokens issued thereon.

Again, various ones of the embodiments herein include a framework which is able to assist in identifying block address ranges having tokens issued thereon for each object and/or file which corresponds to a received operation request. Likewise, some of the embodiments here are able to re-arrange (e.g., distribute) the block address ranges across for parallelization units (e.g., processes, threads, etc.) such that a maximum number of parallelization units are in a working state.

As a result, the embodiments herein achieve performance rates and efficiency which is significantly higher than has traditionally been achievable, particularly in cloud tiering environments. Again, these significant improvements stem from the ability to invoke multiple threads to work on each object and/or file in a cloud-tier environment. Moreover, the ability to determine whether a token is issued for each block address and rearrange the block addresses across the parallelization units desirably accelerates backup procedures, restores operation scheduling, etc.

These improvements are particularly desirable in cloud tiering embodiments (e.g., such as transparent cloud tiering), particularly in those which involve cloud-as-tier services, as customers are able to effectively plan and utilize the cloud storage environment, filesystem resources, etc., in order to accurately estimate backup and/or restore durations, e.g., as would be appreciated by one skilled in the art after reading the present description.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
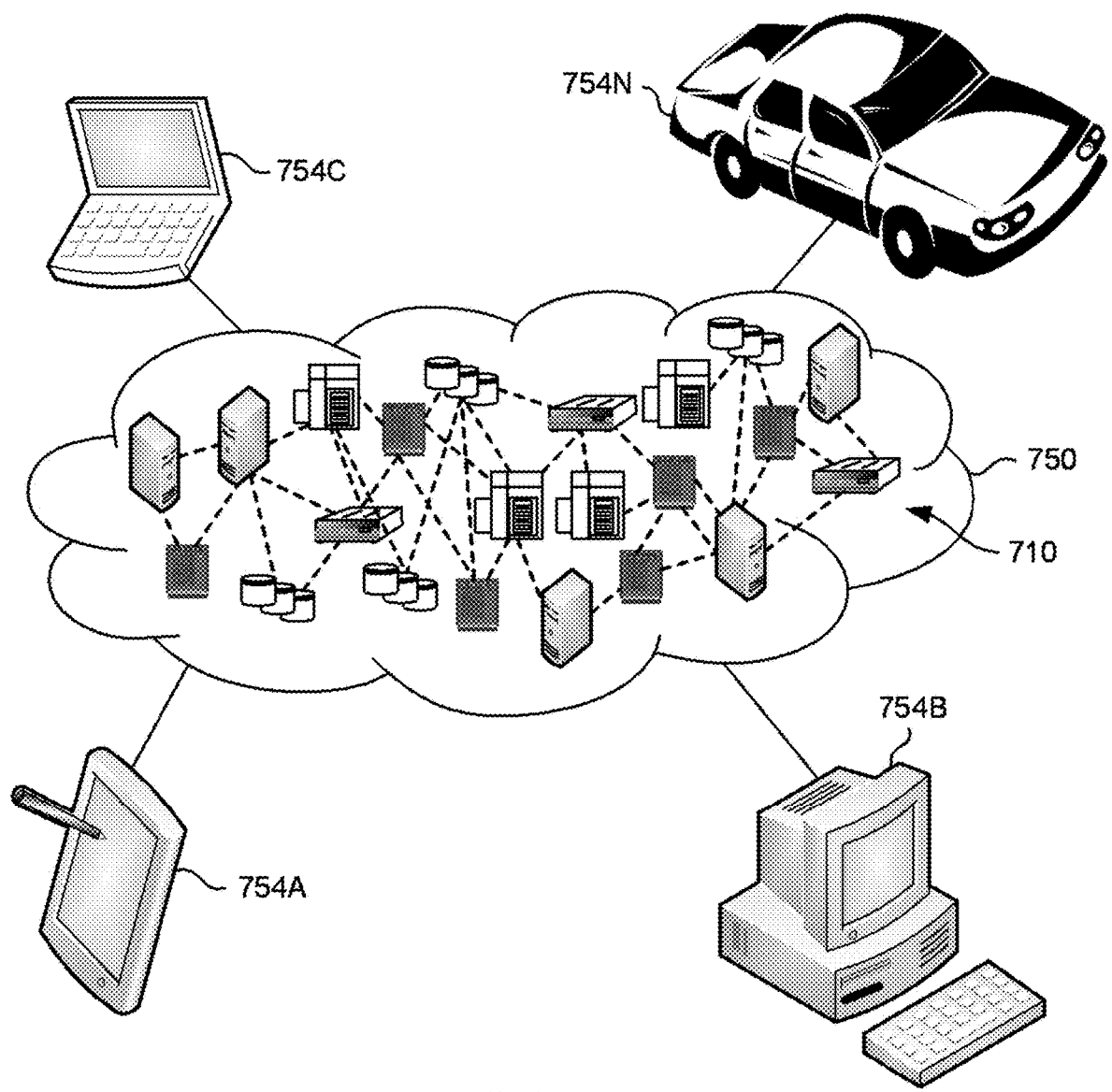
FIG. 7 is representational view of a cloud computing environment in accordance with one embodiment.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
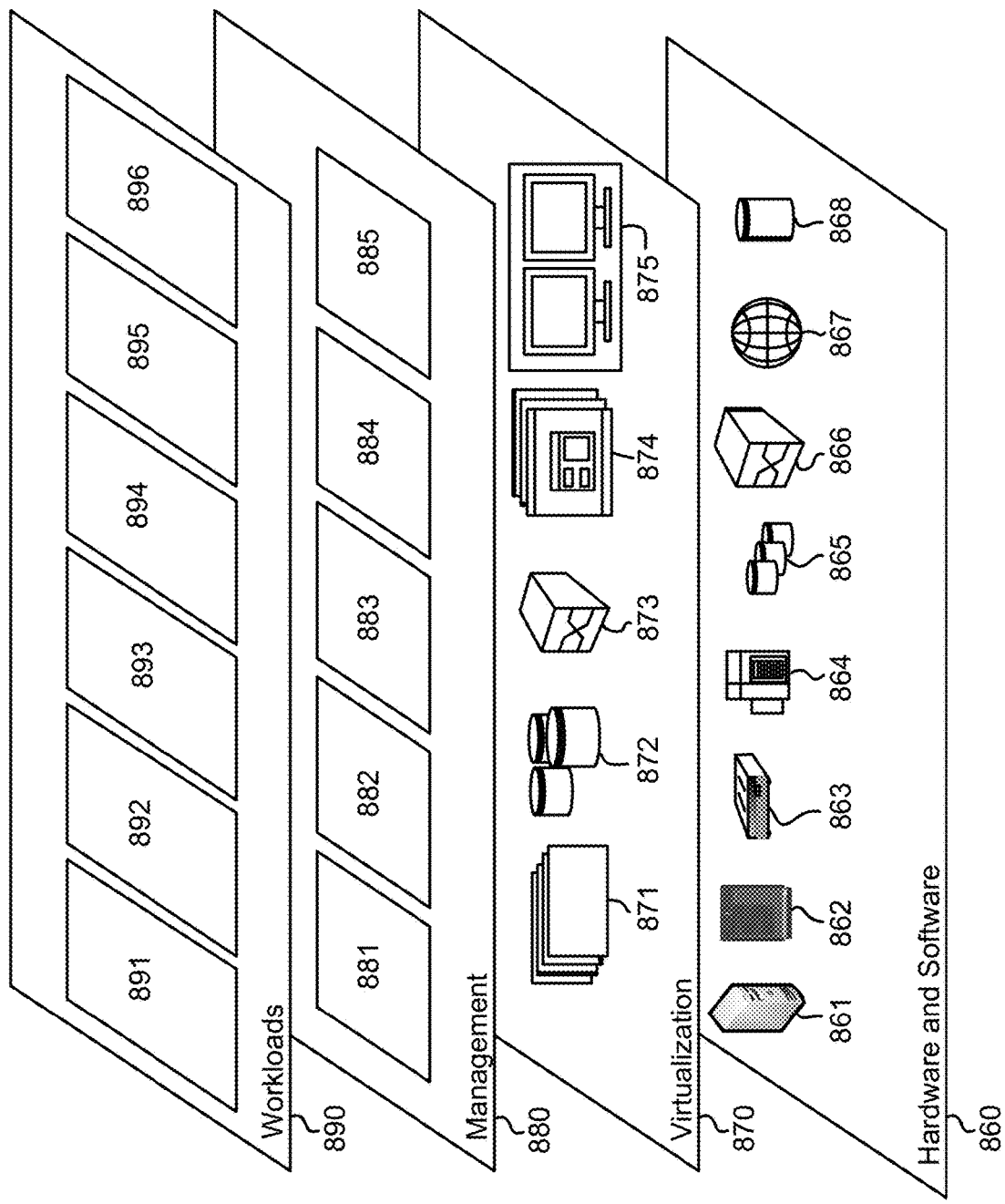
FIG. 8 is a representational view of abstraction model layers in accordance with one embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and prioritizing block address organization in order to increase parallelization 896.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying block addresses which are associated with a given object;
combining the block addresses to a first set in response to determining that at least one token is currently issued on one or more of the identified block addresses;
transitioning a first portion of the block addresses to a second set, wherein the first portion includes ones of the block addresses determined as having a token currently issued thereon;
dividing a second portion of the block addresses into equal chunks, wherein the second portion includes the block addresses remaining in the first set;
allocating the chunks in the first set across two or more parallelization units;
dividing the block addresses in the second set into equal chunks; and
allocating the chunks in the second set to at least one dedicated parallelization unit.

2. The computer-implemented method of claim 1, comprising:
dividing the identified block addresses into equal chunks in response to determining that tokens are not currently issued on any of the identified block addresses; and
allocating the chunks across the two or more parallelization units and the at least one dedicated parallelization unit.

3. The computer-implemented method of claim 1, wherein tokens are issued on block addresses by one or more selected nodes, wherein the one or more nodes are selected from nodes that have been designated as managers.

4. The computer-implemented method of claim 1, wherein the given object corresponds to a data access request received from a remote storage location.

5. The computer-implemented method of claim 4, wherein each of the two or more parallelization units perform a portion of the data access request which corresponds to the chunks of the given object allocated thereto, in parallel.

6. The computer-implemented method of claim 1, wherein the token is a byte-range lock or a Portable Operating System Interface (POSIX) lock.

7. The computer-implemented method of claim 1, wherein the operations are performed by a processor included at a cloud storage location of a cloud tiering environment.

8. A computer program product comprising a computer readable storage medium having program instructions embodied therewith, the program instructions readable and/or executable by a processor to cause the processor to perform a method comprising:
identifying, by the processor, block addresses which are associated with a given object;
combining, by the processor, the block addresses to a first set in response to determining that at least one token is currently issued on one or more of the identified block addresses;
transitioning, by the processor, a first portion of the block addresses to a second set, wherein the first portion includes ones of the block addresses determined as having a token currently issued thereon;
dividing, by the processor, a second portion of the block addresses into equal chunks, wherein the second portion includes the block addresses remaining in the first set;
allocating, by the processor, the chunks in the first set across two or more parallelization units;
dividing, by the processor, the block addresses in the second set into equal chunks; and allocating, by the processor, the chunks in the second set to at least one dedicated parallelization unit.

9. The computer program product of claim 8, the program instructions readable and/or executable by the processor to cause the processor to perform the method comprising:
dividing, by the processor, the identified block addresses into equal chunks in response to determining that tokens are not currently issued on any of the identified block addresses; and
allocating, by the processor, the chunks across the two or more parallelization units and the at least one dedicated parallelization unit.

10. The computer program product of claim 8, wherein tokens are issued on block addresses by one or more selected nodes, wherein the one or more nodes are selected from nodes that have been designated as managers.

11. The computer program product of claim 8, wherein the given object corresponds to a data access request received from a remote storage location.

12. The computer program product of claim 11, wherein each of the two or more parallelization units perform a portion of the data access request which corresponds to the chunks of the given object allocated thereto, in parallel.

13. The computer program product of claim 8, wherein the token is a byte-range lock or a Portable Operating System Interface (POSIX) lock.

14. The computer program product of claim 8, wherein the processor is included at a cloud storage location of a cloud tiering environment.

15. A system, comprising:
a processor; and
logic integrated with the processor, executable by the processor, or integrated with and executable by the processor, the logic being configured to:
identify, by the processor, block addresses which are associated with a given file;
combine, by the processor, the block addresses to a first set in response to determining that at least one token is currently issued on one or more of the identified block addresses;
transition, by the processor, a first portion of the block addresses to a second set, wherein the first portion includes ones of the block addresses determined as having a token currently issued thereon;
divide, by the processor, a second portion of the block addresses into equal chunks, wherein the second portion includes the block addresses remaining in the first set;
allocate, by the processor, the chunks in the first set across two or more parallelization units;
divide, by the processor, the block addresses in the second set into equal chunks; and
allocate, by the processor, the chunks in the second set to at least one dedicated parallelization unit.

16. The system of claim 15, the logic being configured to:
divide, by the processor, the identified block addresses into equal chunks in response to determining that tokens are not currently issued on any of the identified block addresses; and
allocate, by the processor, the chunks across the two or more parallelization units and the at least one dedicated parallelization unit.

17. The system of claim 15, wherein tokens are issued on block addresses by one or more selected nodes, wherein the one or more nodes are selected from nodes that have been designated as managers.

18. The system of claim 15, wherein the given file corresponds to a data access request received from a remote storage location.

19. The system of claim 18, wherein each of the two or more parallelization units perform a portion of the data access request which corresponds to the chunks of the given file allocated thereto, in parallel.

20. The system of claim 15, wherein the token is a byte-range lock or a Portable Operating System Interface (POSIX) lock.

* * * * *